(12) United States Patent
Mazzamurro et al.

(10) Patent No.: US 11,370,331 B2
(45) Date of Patent: Jun. 28, 2022

(54) VEHICLE SEAT BACKREST, VEHICLE SEAT COMPRISING SUCH A BACKREST, AND METHOD FOR MANUFACTURING SUCH A SEAT BACKREST

(71) Applicant: FAURECIA Sièges d'Automobile, Nanterre (FR)

(72) Inventors: Frédéric Mazzamurro, Saint Jean de Braye (FR); Dimitri Unrau, Niedernwöhren (DE)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/104,655

(22) Filed: Nov. 25, 2020

(65) Prior Publication Data
US 2021/0162893 A1 Jun. 3, 2021

(30) Foreign Application Priority Data

Nov. 29, 2019 (FR) ........................................ 1913568

(51) Int. Cl.
*B60N 2/22* (2006.01)
*B60N 2/02* (2006.01)

(52) U.S. Cl.
CPC ......... *B60N 2/2222* (2013.01); *B60N 2/0232* (2013.01); *B60N 2002/0236* (2013.01)

(58) Field of Classification Search
CPC ................ B60N 2/2222; B60N 2/0232; B60N 2002/0236
USPC ..................................................... 297/284.1
See application file for complete search history.

(56) References Cited

U.S. PATENT DOCUMENTS

| 7,845,729 | B2* | 12/2010 | Yamada | B60N 2/0232 297/284.1 |
| 8,042,415 | B2* | 10/2011 | Ito | B60N 2/929 74/89.23 |
| 2009/0236891 | A1* | 9/2009 | Ito | B60N 2/929 297/354.12 |
| 2010/0236343 | A1* | 9/2010 | Chiang | F16H 25/20 74/89.34 |
| 2014/0159459 | A1* | 6/2014 | Kwon | B60N 2/2209 297/391 |

FOREIGN PATENT DOCUMENTS

| FR | 2867725 A1 | 9/2005 |
| FR | 3079464 A1 | 10/2019 |

OTHER PUBLICATIONS

French Preliminary Search Report for French App. No. FR1913568 dated Aug. 17, 2020, 8 pages.

* cited by examiner

*Primary Examiner* — Mark R Wendell
(74) *Attorney, Agent, or Firm* — Barnes & Thornburg LLP

(57) ABSTRACT

A method for manufacturing a vehicle seat backrest comprises the steps of: providing first and second uprights of a backrest frame and a support member of an upper backrest adjustment device; positioning the first upright partly facing a first side face of the support member and the second upright partly facing a second side face of the support member; moving the first upright relative to the second upright along a transverse direction of the support member, in order to sandwich the support member such that the support member of the upper backrest adjustment device is mounted on the first and second uprights of the backrest frame so as to pivot about a transverse axis.

16 Claims, 9 Drawing Sheets

VEHICLE SEAT BACKREST, VEHICLE SEAT COMPRISING SUCH A BACKREST, AND METHOD FOR MANUFACTURING SUCH A SEAT BACKREST

PRIORITY CLAIM

This application claims priority to French Patent Application No. FR1913568, filed Nov. 29, 2019, which is expressly incorporated by reference herein.

BACKGROUND

The present disclosure relates to a vehicle seat backrest, and to a vehicle seat comprising such a backrest. This present disclosure also relates to a method for manufacturing such a vehicle seat backrest.

SUMMARY

According to the present disclosure, a method for manufacturing a vehicle seat backrest is provided. The method comprising the steps of:
- providing a first upright of a backrest frame, a second upright of the backrest frame, and a support member of an upper backrest adjustment device,
- positioning the first backrest frame upright partly facing a first side face of the support member and the second backrest frame upright partly facing a second side face of the support member,
- moving the first upright relative to the second upright of the backrest frame, along a transverse direction of the support member, in order to sandwich the support member of the upper backrest adjustment device, such that the support member of the upper backrest adjustment device is mounted on the first and second uprights of the backrest frame so as to pivot about a transverse axis.

The correct positioning of the first upright and second upright, ready to form the backrest frame, and the assembly of the support member of the upper backrest adjustment device to the first and second uprights, are thus performed simultaneously. The time required to carry out such a method for manufacturing a vehicle seat backrest and the associated costs are therefore reduced.

According to certain advantageous aspects, the method for manufacturing the vehicle seat backrest may include one or more of the following features, alone or in any of the possible technical combinations:
- in step iii, reliefs of the first and second uprights of the backrest frame and reliefs of the support member are associated in order to guide the support member of the upper backrest adjustment device in rotation about the transverse axis,
- in step iii, the reliefs of the first and second uprights are associated by the complementarity of their shapes with the reliefs of the support member or with a part interposed between the reliefs of the support member and the reliefs of the first and second uprights,
- the method comprises a step i', consisting of positioning a crossmember of the backrest frame relative to the support member, step i' preferably being carried out between step i and ii or after step iii,
- the method comprises a step iv, consisting of fixing the crossmember of the backrest frame to the first upright and/or second upright of the backrest frame, preferably by welding,
- the method comprises a step v, consisting of fixing an actuator of the upper backrest adjustment device to the support member and/or to at least one among the first upright, the second upright, and/or the crossmember of the backrest frame where appropriate, the actuator being able to control the rotation of the support member about the transverse axis.

According to another aspect, a vehicle seat backrest is provided, the backrest comprising a backrest frame and an upper backrest adjustment device, the backrest frame comprising a first upright and a second upright, the upper backrest adjustment device comprising a support member, the support member comprising a body intended to receive and support the upper back of an occupant of the seat, the support member being mounted so as to pivot on the first and second uprights of the backrest frame about a transverse axis, the support member and the first and second uprights of the backrest frame comprising associated reliefs, associated in particular by the complementarity of their shapes, for guiding the support member in rotation relative to the first and second uprights of the backrest frame, about the transverse axis.

In illustrative embodiments, the vehicle seat backrest may comprise one or more of the following features, alone or in any of the possible technical combinations:
- the reliefs of the support member project transversely from the body of the support member, the reliefs of the support member preferably extending from the side faces of the body of the support member, the reliefs of the support member each being received in a housing of the first and second uprights of the backrest frame,
- the reliefs of the support member are made as one piece with the body of the support member, the body of the support member and the reliefs of the support member preferably being made of plastic,
- the reliefs of the support member are cylindrical of revolution, their axes being the transverse axis,
- the backrest further comprises bushings mounted on the reliefs of the support member, the bushings having an outer face complementary to the housings of the first and second uprights of the backrest frame in order to guide the support member in rotation relative to the first and second uprights of the backrest frame, about the transverse axis,
- the upper backrest adjustment device comprises an actuator, for adjusting the position of the support member about the transverse axis,
- the actuator comprises:
- a motor,
- a worm screw extending in a main direction of extension perpendicular to the transverse axis, and able to be moved along said main direction of extension by the rotation of the motor,
- a movable assembly at one end of the worm screw,
- at least one connecting rod, the connecting rod being mounted so as to pivot relative to said movable assembly about a first shaft parallel to the transverse axis, at a first end, the connecting rod also being mounted so as to pivot relative to the backrest frame about a second shaft parallel to the transverse axis, at a second end, such that the displacement of the worm screw parallel to the transverse axis, due to the rotation of the motor, causes rotation of the support member about said transverse axis.

In illustrative embodiments, a vehicle seat is disclosed comprising a seating portion with a seating portion frame, and a seat backrest as described above, the backrest frame being fixed to the seating portion frame, the backrest frame preferably being mounted so as to pivot relative to the seating portion frame, about a direction parallel to said transverse axis.

In illustrative embodiments, an upper backrest adjustment device is disclosed for a vehicle seat, the vehicle seat comprising a backrest with a backrest frame, the upper backrest adjustment device comprising a support member, the support member comprising a body intended to receive and support the upper back of an occupant of the seat, the support member further comprising reliefs intended to be associated, in particular by the complementarity of their shapes, with housings in the backrest frame, in order to guide a rotation, about a transverse axis, of the support member relative to the backrest frame, the reliefs projecting transversely from the body of the support member, the reliefs preferably extending from the side faces of the body of the support member.

In illustrative embodiments, the upper backrest adjustment device of the vehicle seat may include one or more of the following features, alone or in any of the possible technical combinations: the reliefs of the support member are made as one piece with the body of the support member, the body of the support member and the reliefs of the support member preferably being made of plastic,
- the reliefs of the support member are cylindrical of revolution, their axes being the transverse axis,
- the upper backrest adjustment device further comprises bushings mounted on the reliefs of the support member, the bushings having an outer face complementary to the housings of the first and second uprights of the backrest frame in order to guide the support member in rotation relative to the first and second uprights of the backrest frame, about the transverse axis,
- the upper backrest adjustment device comprises an actuator, for adjusting the position of the support member about said transverse axis,
- the actuator comprises:
- a motor,
- a worm screw extending in a main direction of extension perpendicular to the transverse axis, and able to be moved along said main direction of extension by the rotation of the motor,
- a movable assembly at one end of the worm screw,
- at least one connecting rod, the connecting rod being mounted so as to pivot relative to said movable assembly about a first shaft parallel to the transverse axis, at a first end, and intended to be mounted so as to pivot relative to the backrest frame about a second shaft parallel to the transverse axis, at a second end, such that the displacement of the worm screw due to the rotation of the motor is able to cause rotation of the support member about said transverse axis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically represents a side view of a vehicle seat;

Figure 6:
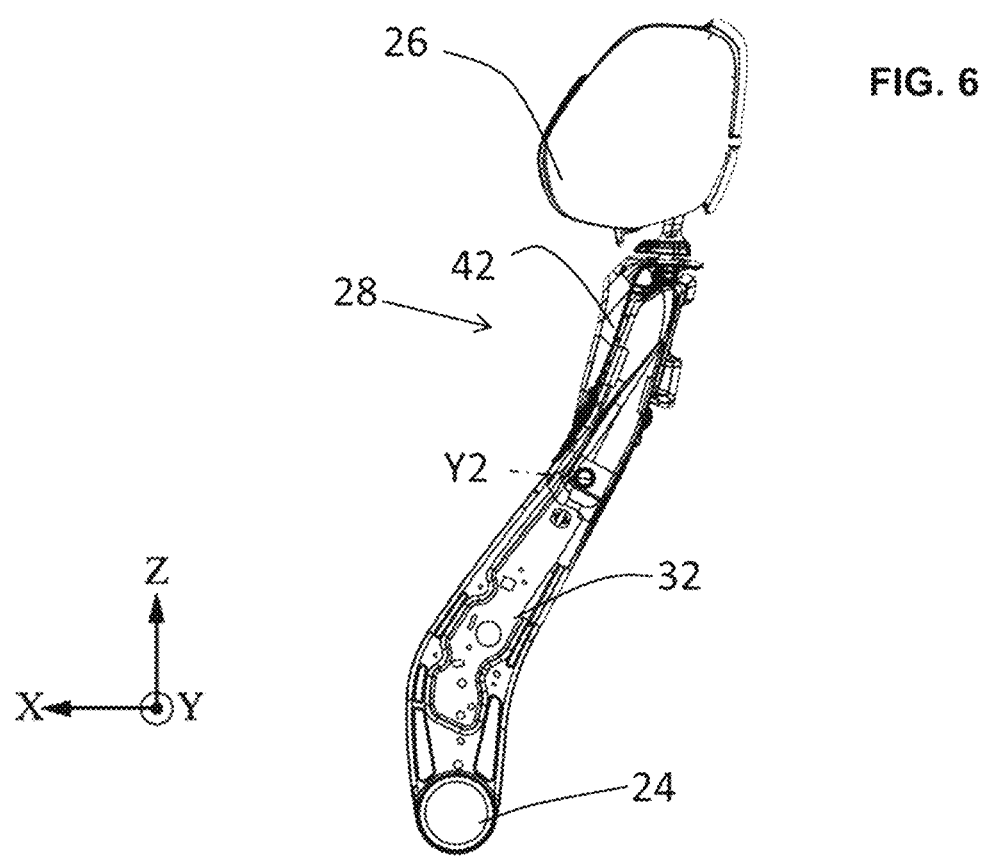
FIG. 6 represents a side view of the backrest of the vehicle seat of FIG. 1, with an example of an upper backrest adjustment device in a retracted position.
Figure 7:
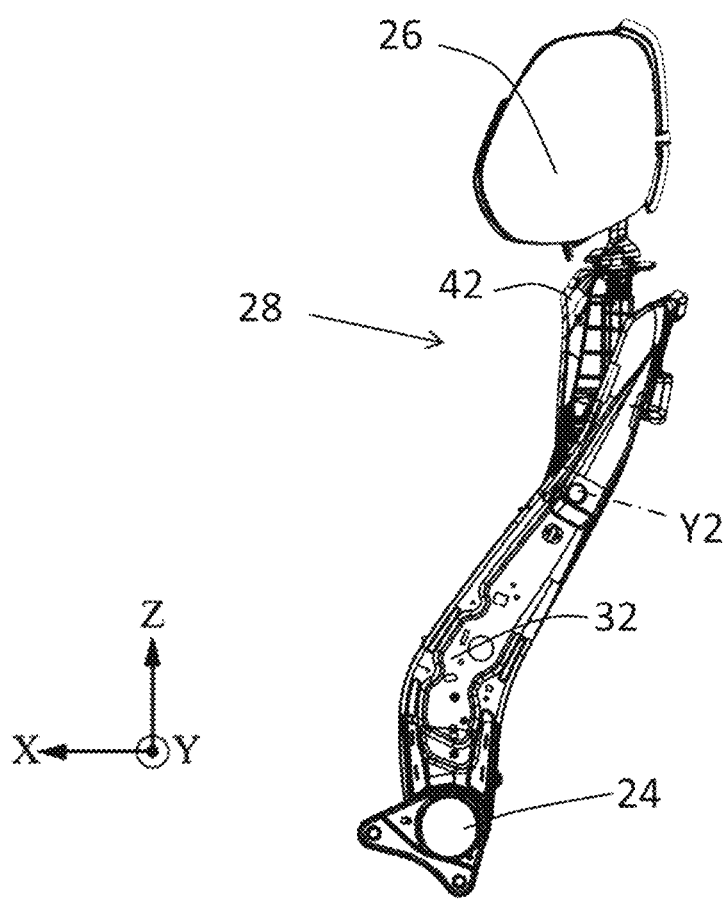
FIG. 7 represents a view similar to FIG. 6, the upper backrest adjustment device being represented in a more advanced position.
Figure 9:
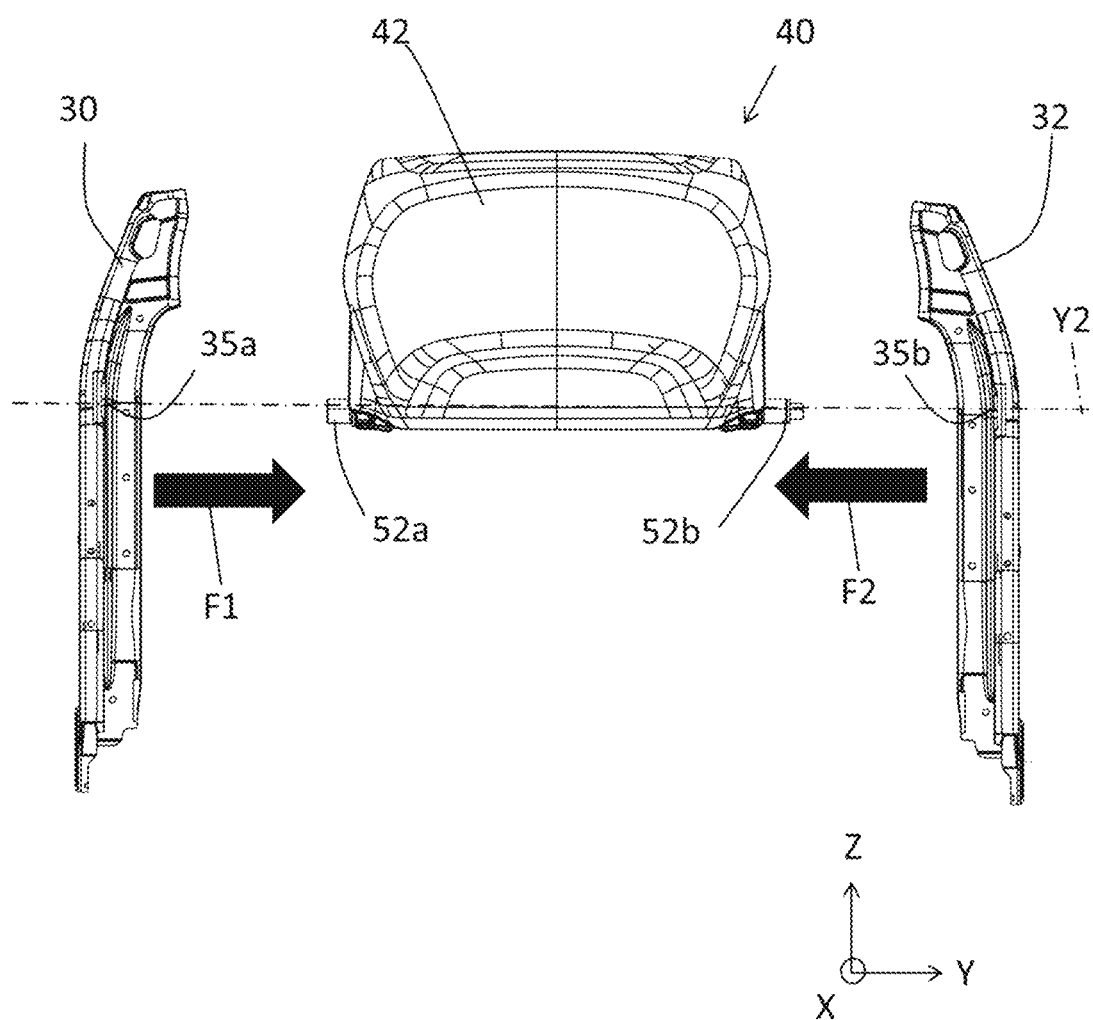
Figure 10:
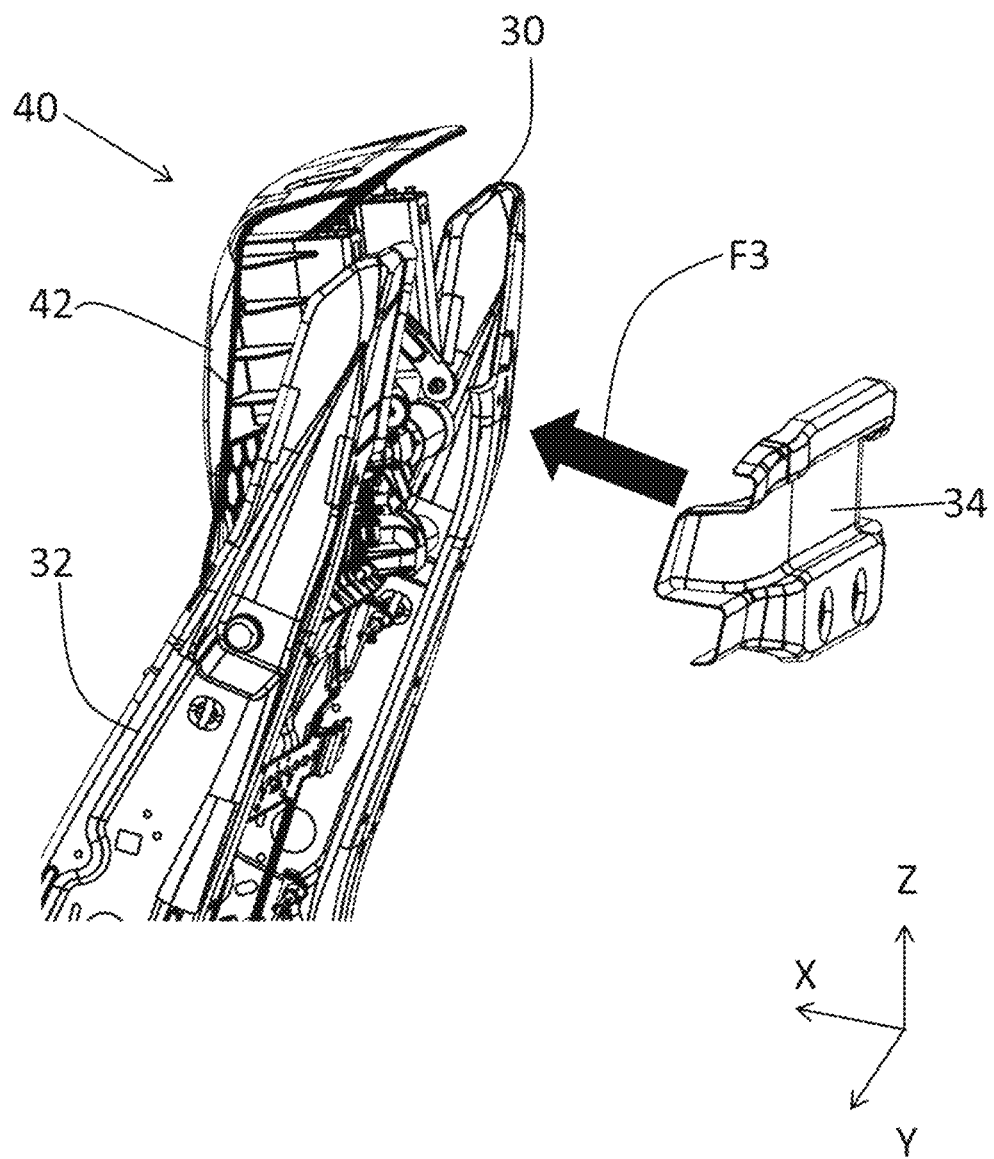

FIG. 9 schematically illustrates a first step of a method for manufacturing the seat backrest of FIGS. 6 and 7; and FIG. 10 schematically illustrates a second step of a method for manufacturing the seat backrest of FIGS. 6 and 7.

DETAILED DESCRIPTION

In the various figures, the same references designate identical or similar elements. For brevity, only those elements which are useful to understanding the described embodiment are represented in the figures and are described in detail below. Only the differences between the examples presented are described in detail.

In the following description, when reference is made to absolute position qualifiers, such as the terms "front", "rear", "top", "bottom", "left", "right", etc., or relative qualifiers, such as the terms "above", "below", "upper", "lower", etc., or to orientation qualifiers, such as "horizontal", "vertical", etc., unless otherwise specified these are in reference to the orientation of the figures or of a seat in its normal position of use.

In the following, the longitudinal direction X means the longitudinal direction of the seat. The longitudinal direction of the seat is considered to be the same as the longitudinal direction of the motor vehicle in which the seat is mounted. This longitudinal direction X corresponds to the normal direction of travel of the vehicle. The longitudinal direction X is preferably horizontal. The transverse direction Y is the transverse direction of the seat. The transverse direction of the seat thus corresponds to the transverse or lateral direction of the motor vehicle. This transverse direction corresponds to a direction perpendicular to the normal direction of travel of the vehicle. The transverse direction Y is preferably horizontal. Finally, the vertical direction Z is a vertical direction of the seat, perpendicular to the longitudinal X and transverse Y directions.

Figure 1:
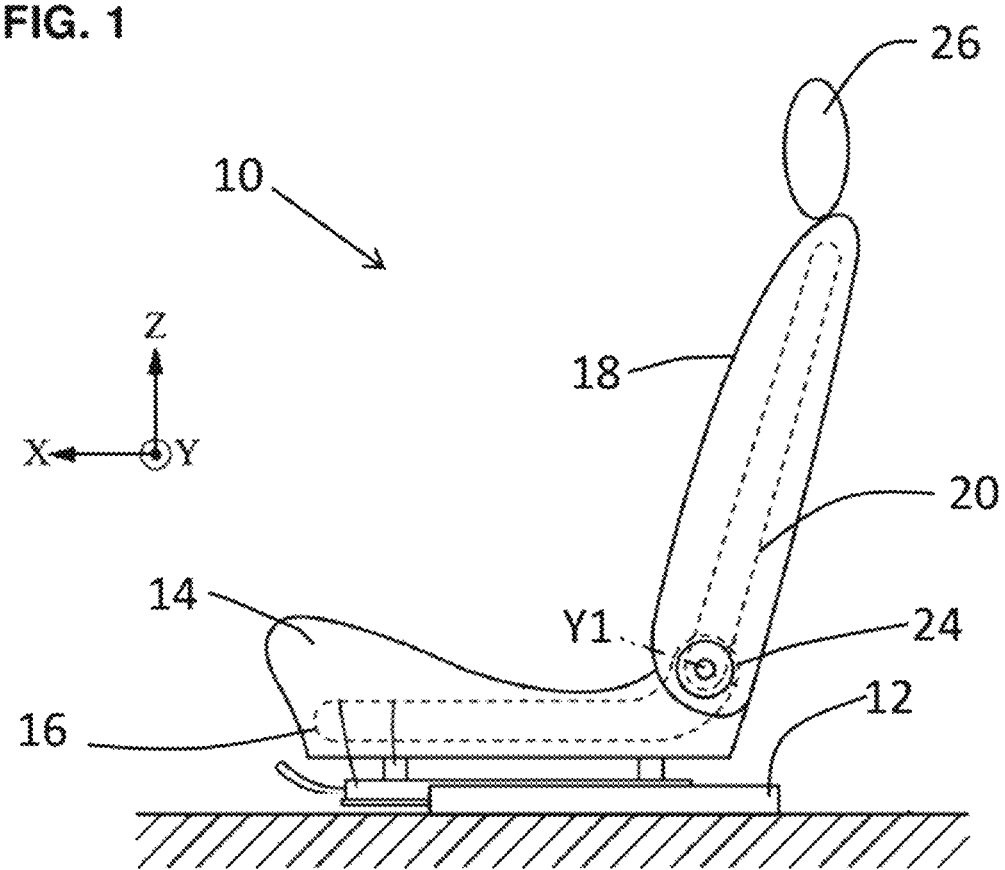

FIG. 1 schematically represents a motor vehicle seat 10 mounted on a slide mechanism 12.

The seat 10 comprises a seating portion 14 with a seating portion frame 16. The seat also comprises a backrest 18 with a backrest frame 20. The backrest frame 20 is mounted on the seating portion frame 16 by at least one hinge mechanism 24, so as to pivot about a first transverse axis Y1. The seat 10 can slide in the longitudinal direction X of the slides 12.

The seat 10 also comprises a headrest 26.

In the following, the seat backrest 18 is described in more detail. Here the backrest 18 comprises an upper backrest adjustment device 28.

Figure 2:
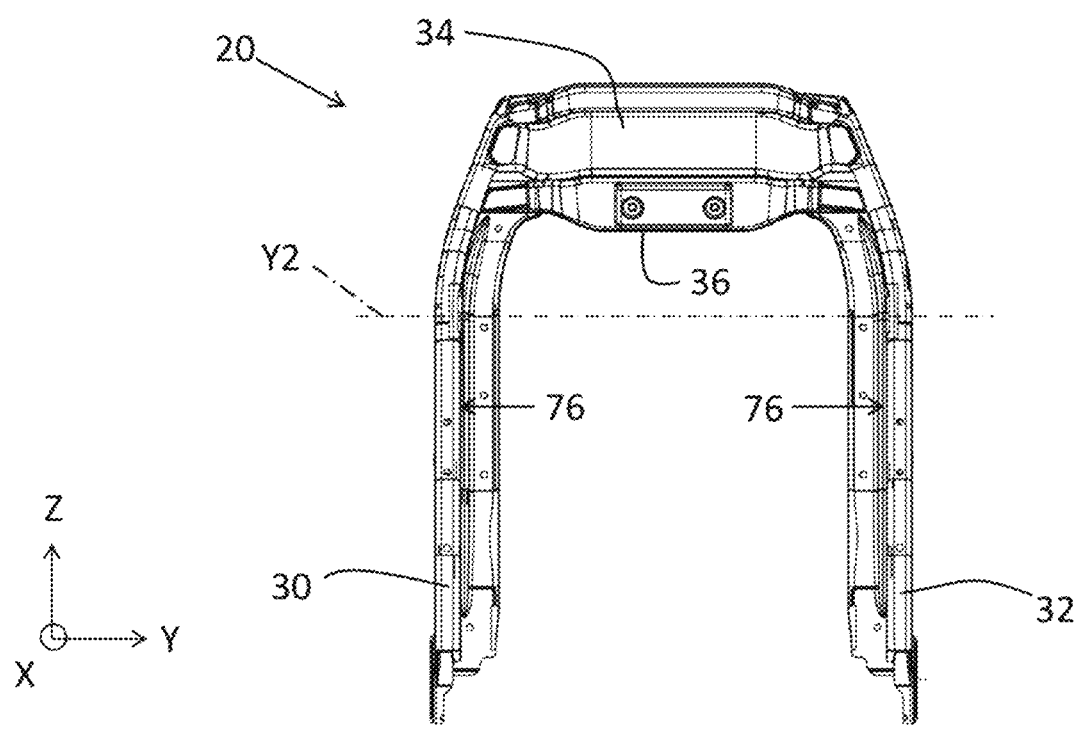
FIG. 2 represents a front view of the backrest frame of the vehicle seat of FIG. 1.

Referring to FIG. 2, the backrest frame 20 of such a backrest 18 here comprises a first upright 30 and a second upright 32. In the example illustrated, the backrest frame 20 further comprises a crossmember 34. The crossmember 34 here is an upper crossmember. Indeed, the crossmember 34 is fixed to the upper end portions of the first and second uprights 30, 32 of the backrest frame 20. The upper ends of the first and second uprights 30, 32 are for example the ends of the first and second uprights 30, 32 that are opposite their respective ends intended to receive a hinge mechanism 24.

The backrest frame 20 may further comprise a lower crossmember. A lower crossmember connects the lower end portions of the first and second uprights 30, 32 of the backrest frame 20. The lower end of an upright 30, 32 is for example the end near which a hinge mechanism is intended to be fixed.

A first hinge mechanism 24 is here received in a housing located near a lower end of the first upright 30 of the backrest frame 20. Similarly, a hinge mechanism 24 is received in a housing located near a lower end of the second upright 32 of the backrest frame 20. Such hinge mechanisms 24 are known. Therefore, these hinge mechanisms 24 are not described in more detail here.

Figure 3:
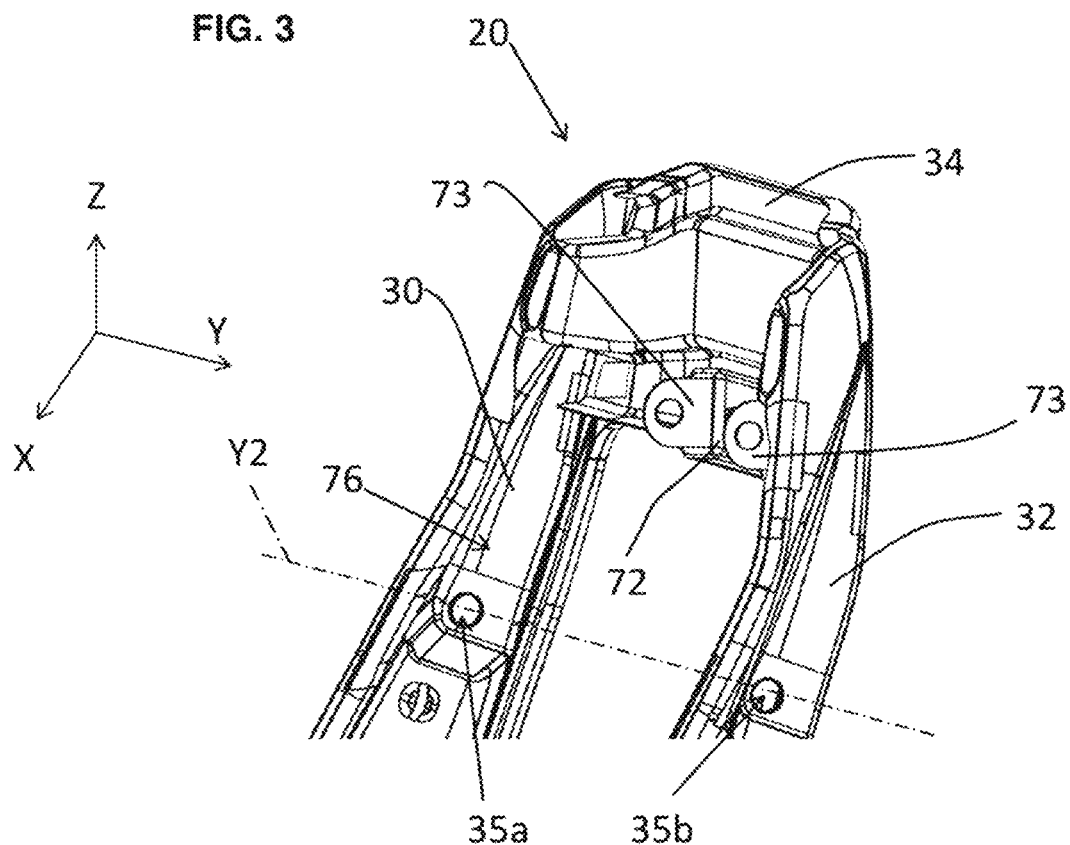
FIG. 3 represents a partial perspective view of the backrest frame of FIG. 2.

As represented in FIG. 3, each upright 30, 32 of the backrest frame 20 has a relief 35a, 35b, here an inward relief, respectively forming a first housing 35a in the first upright 30 and a second housing 35b in the second upright 32. The first housing 35a is positioned transversely facing the second housing 35b, in the direction of a second transverse axis Y2. Here each of the first and second housings 35a, 35b is cylindrical of revolution, their axes being the second transverse axis Y2. In the example represented, the first housing 35a is a through-hole. In other words, the first housing 35a passes entirely through the first upright 30, along the direction of the second transverse axis Y2. Similarly, the second housing 35b is a through-hole, in other words the second housing 35b passes entirely through the second upright 32, along the direction of the second transverse axis Y2.

The upper backrest adjustment device 28 firstly comprises a support member 40.

Figure 4:
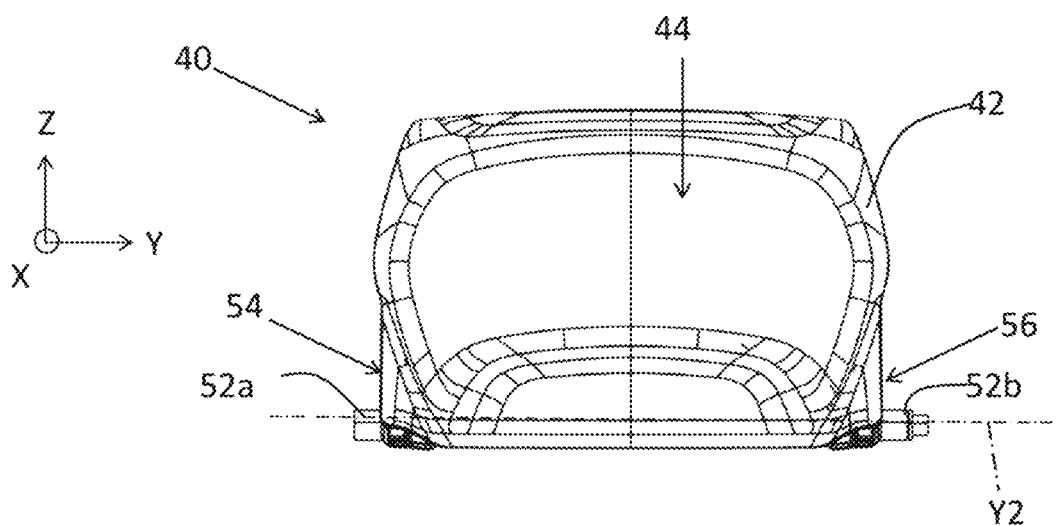
FIG. 4 represents a front view of a support member of an upper backrest adjustment device which can be implemented in the seat of FIG. 1.

The support member 40 is more particularly visible in FIG. 4. As illustrated in this FIG. 4, the support member 40 comprises a body 42 for receiving and supporting the upper back of a seat occupant 10. In other words, the body 42 of the support member 40 is intended to be in contact with the upper back of the seat occupant, in particular with the shoulders and/or shoulder blades of the occupant, possibly with an intermediate lining and/or cover at least partially covering the body 42 of the support member 40. The body 42 has a front face 44, intended to be oriented towards the upper back of an occupant of the seat 10. The front face 44 is preferably flat or concave. The body 42 also comprises a rear face 46 opposite to the front face 44. The rear face 46, visible in FIG. 5, may comprise reinforcing ribs 50. The reinforcing ribs 50 here form cells.

The body 42 of the support member 40 also comprises two cylindrical hollow bodies 48 suitable for receiving the pins of the headrest 26. Each cylindrical hollow body 48 is formed on the rear face 46 of the body 42. Each cylindrical hollow body 48 extends in a substantially vertical direction. Substantially vertical is understood here to mean a direction having at least one vertical component. Each of the cylindrical hollow bodies 48 may be integral with the body 42. Each cylindrical hollow body 48 may have a square cross section. A headrest attachment system 26 comprising pins received in cylindrical hollow bodies 48 is known per se and therefore is not described in more detail hereinafter. Here, such a system makes it possible to adjust the longitudinal position of the headrest 26 by adjusting the longitudinal position of the upper backrest adjustment device 28.

The support member 40 illustrated in FIG. 4 further comprises two reliefs 52a, 52b, here projecting. A first projecting relief 52a extends transversely along the direction of the second transverse axis Y2, from a first side face 54 of the body 42. The second projecting relief 52b extends transversely along the direction of the second transverse axis Y2, from a second side face 56 of the body 42. The second side face 56 of the body 42 is opposite the first side face 54.

Each projecting relief 52a, 52b of the support member 40 has a shape and dimensions enabling it to be received in a respective housing 35a, 35b of an upright 30, 32 of the backrest frame 20. According to the example represented, the first projecting relief 52a of the support member 40 is received in the first housing 35a of the first upright 30 of the backrest frame 20. Similarly, the second projecting relief 52b of the support member 40 is received in the second housing 35b of the second upright 32 of the backrest frame 20. The support member 40 is thus held between the first and second uprights 30, 32 of the backrest frame 20.

Furthermore, each projecting relief 52a, 52b of the support member 40 is associated by the complementarity of its shape with the respective housing 35a, 35b of the upright 30, 32 of the backrest frame 20, in which it is received. "Associated by the complementarity of its shape" is understood here to mean that:

each projecting relief 52a, 52b has a shape that is complementary with the housing 35a, 35b in which it is received, or an intermediate part, mounted on each projecting relief 52a, 52b, has a shape that is complementary with the housing 35a, 35b in which is received the assembly formed by the projecting relief 52a, 52b on which the intermediate part is mounted, or an intermediate part, mounted in each housing 35a, 35b, defines a cavity which has a shape that is complementary with the projecting relief 52a, 52b which is received therein.

Here, the receiving of the projecting reliefs 52a, 52b in housings 35a, 35b, of shapes complementary to the projecting reliefs 52a, 52b, makes it possible to guide the support member 40 in rotation relative to the first and second uprights 30, 32 of the backrest frame 20, about the second transverse axis Y2. In this first described example, no intermediate part is necessary between the projecting reliefs 52a, 52b and the housings 35a, 35b. Here, each projecting relief 52a, 52b has a cylindrical shape of revolution, its axis the second transverse axis Y2, enabling pivoting within the associated housing 35a, 35b, cylindrical of revolution, its axis the second transverse axis Y2.

Each projecting relief 52a, 52b of the support member 40 here is integral to the body 42. Each projecting relief 52a, 52b of the support member 40 may be made as one piece with the body 42 of the support member 40. For example, the body 42 and the projecting reliefs 52a, 52b of the support member 40 may be made of plastic. More particularly, the body 42 and the projecting reliefs 52a, 52b may be formed according to methods for shaping thermoformable materials, such as injection molding for example.

The support member 40 can thus be mounted on the backrest frame 20 so as to pivot forward or backward about the second transverse axis Y2. It is thus possible to adjust the position of the support member 40, for better comfort for the occupant of the seat 10.

In a retracted position of the support member 40 as represented in FIG. 6, the body 42 of the support member 40 is partly arranged between the uprights 30, 32 of the backrest frame 20. In this case, the body 42 is also partly arranged facing the upper crossmember 34 of the backrest frame 20, in the longitudinal direction X. Furthermore, along the vertical direction Z, the second transverse axis Y2 is below a lower end 36 of the upper crossmember 34. In general, the second transverse axis Y2 may be arranged vertically between the upper crossmember 34 and a lower crossmember. In particular, the second transverse axis Y2 may be arranged substantially near the mid-height of the uprights 30, 32.

Figure 8:
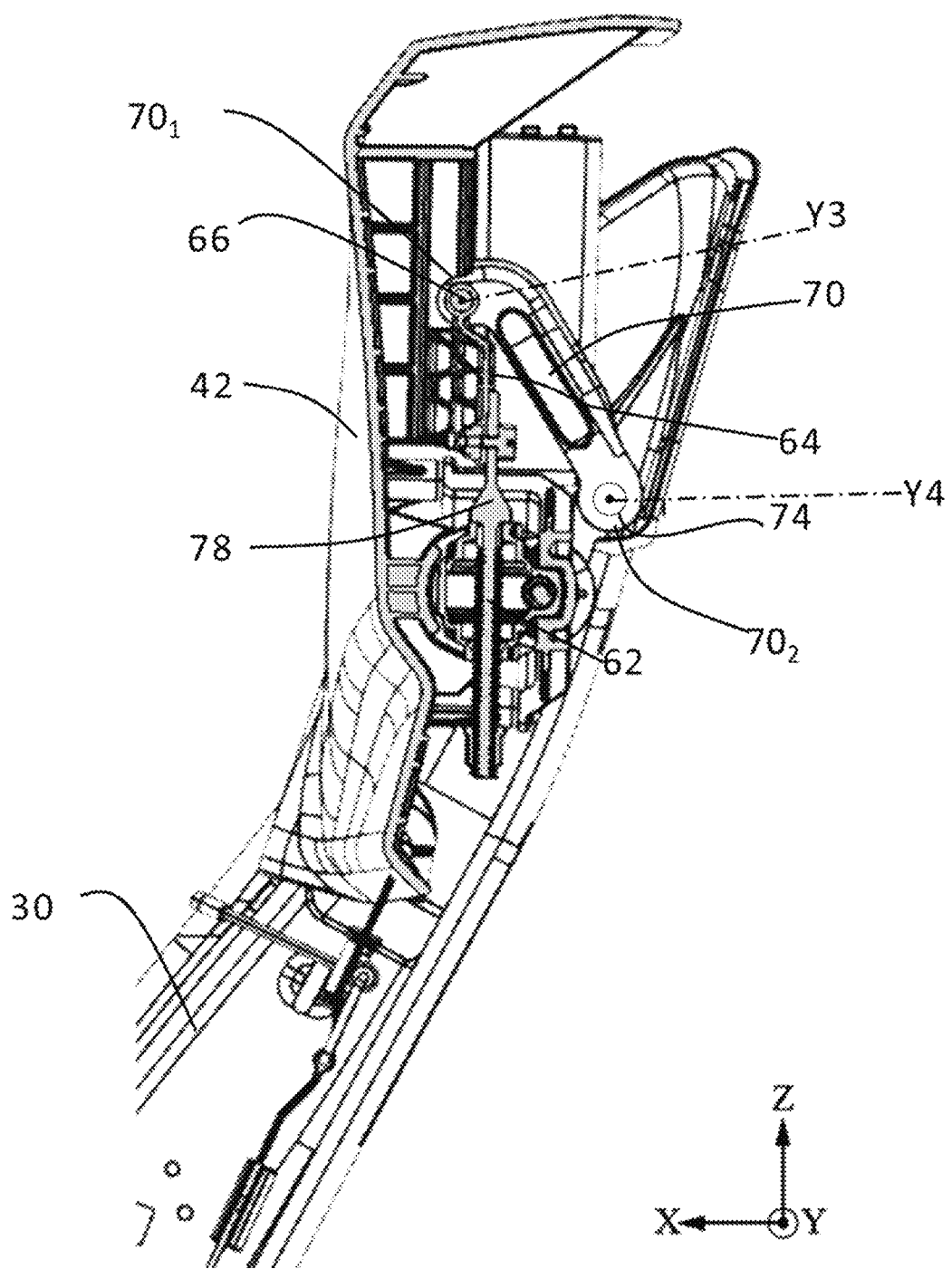
FIG. 8 represents a section view of the vehicle seat backrest of FIG. 7 along section plane VIII-VIII.

FIGS. 7 and 8 illustrate a more advanced position of the support member 40, after forward rotation of the support member 40 from the retracted position. Such a position of the support member 40 can enable support to be provided between the back of a seat occupant and the support member 40, thereby improving the comfort of the occupant.

The support member 40 may be pivoted manually about the second transverse axis Y2. However, preferably and as illustrated, the upper backrest adjustment device 28 comprises an actuator 58, for example as represented in FIG. 5, for controlling the rotation of the support member 40 about the second transverse axis Y2.

Figure 5:
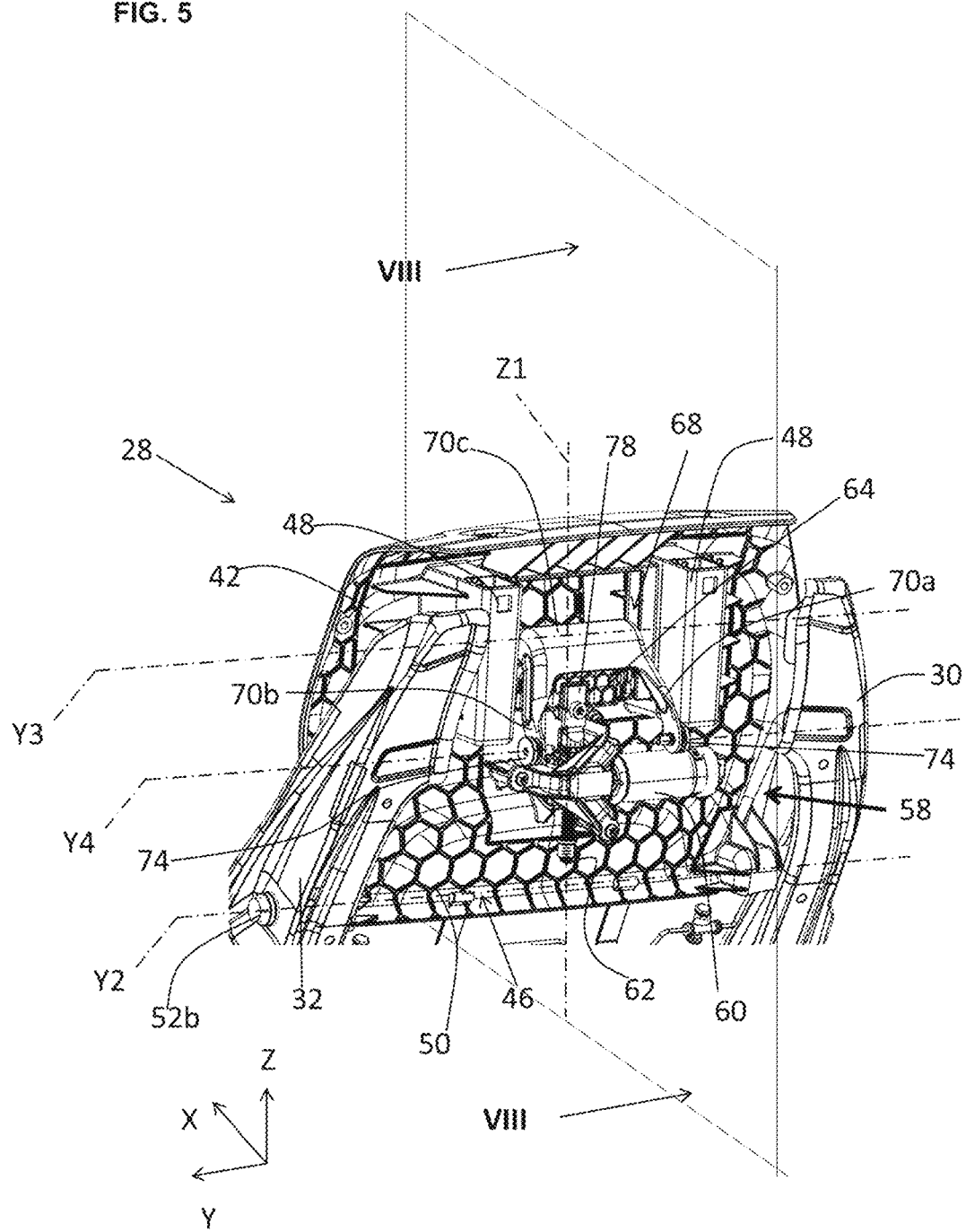
FIG. 5 represents a rear perspective view of the vehicle seat backrest of FIG. 1, from which an upper crossmember of the frame is removed.

In the example illustrated in FIGS. 5 and 8 in particular, the actuator 58 first of all comprises a motor 60 and a worm screw 62. The motor 60 here is fixed to the body 42 of the support member 40. The motor 60 drives the worm screw 62 in translation, here by means of a gear, in a substantially vertical direction Z1 corresponding to the main direction of extension of the worm screw 62. Substantially vertical is understood here to mean that the direction Z1 of extension of the worm screw 62, which is variable, comprises a vertical component.

The actuator 58 also comprises a movable assembly 64. The movable assembly 64 is mounted at the free end of the worm screw 62. In the current case, the movable assembly 64 is fixed to a head 78 mounted at the free end of the worm screw 62. Here, the movable assembly 64 is screwed to the head 78. The movable assembly 64 receives a first shaft 66 extending along a third transverse axis Y3. The first shaft 66 is, for example, free to rotate relative to the movable assembly 64, about the third transverse axis Y3. The movable assembly 64 also includes two lateral extensions received in two parallel grooves 68, extending in a substantially vertical direction. Here, the two grooves 68 are formed in the body 42 of the support member 40. Here the two grooves 68 are rectilinear. However, other shapes of the parallel grooves 68 are possible.

As represented in FIG. 8, the actuator 58 further comprises a connecting rod 70. Near a first end 70$_1$ of the connecting rod 70, the connecting rod 70 has two holes receiving the first shaft 66, able to rotate freely about the third transverse axis Y3. The connecting rod 70 is thus mounted so as to rotate freely about the third transverse axis Y3 relative to the movable assembly 64.

The actuator 58 further comprises a U-shaped guide 72, having two orifices 73 each receiving a shaft 74, the orifices being shaped so that the shafts 74 extend in the direction of a fourth transverse axis Y4. The guide 72 here is fixed to the backrest frame 20, in particular to the upper crossmember 34 of the backrest frame 20. Near a second end 70$_2$, the connecting rod 70 is mounted on the shafts 74 so as to pivot about the fourth transverse axis Y4.

In the example illustrated in FIG. 5, the connecting rod 70 has the general shape of a stirrup (or "U") with a base 70c, here forming the first end 70$_1$ of the connecting rod, and two arms 70a, 70b extending from the base 70c, the free ends of the two arms 70a, 70b forming the second end 70$_2$ of the connecting rod 70.

The actuator 58 operates as follows. Rotation of the motor 60 causes the worm screw 62 to move up or down. The movement of the worm screw 62 causes movement of the movable assembly 64 guided by the receiving of the lateral extensions in the grooves 68. The movement of the movable assembly 64 then causes rotation of the connecting rod 70:

68467 Other types of actuators may be used, however, to control the rotation of the support member 40 about the second transverse axis Y2. Alternatively, the rotation of the support member 40 about the second transverse axis Y2 may be performed manually.

According to an example not shown, a bushing may be mounted, preferably tightly, on each projecting relief 52a, 52b of the support member 40. Thus, each bushing mounted on a projecting relief 52a, 52b of the support member 40, is arranged inside a respective housing 35a, 35b of the uprights 30, 32. Each bushing comprises an outer face having a shape that is complementary with the respective housing 35a, 35b of the uprights 30, 32 in order to allow rotation of the support member 40 relative to the backrest frame 20.

Such bushings are advantageously made of a material containing Teflon, in particular the projecting reliefs 52a, 52b of the support member 40 may be made of plastic and/or the uprights 30, 32 of the backrest frame 20 may be made of metal. The bushings, in particular made of Teflon, make it possible in particular to reduce the noise produced during the rotation of the support member 40 relative to the backrest frame 20.

Each bushing may comprise a collar. The collar may be in the form of at least a portion of a ring. The collar may be located at an end portion of the bushing. Thus, each bushing, mounted on a projecting relief 52a, 52b of the support member 40 and arranged inside a respective housing 35a, 35b of the uprights 30, 32, is positioned in abutment with a transverse inside face 76 of the respective upright 30, 32. Movement of the support member 40 in a transverse direction Y relative to the backrest frame 20 is then limited or even prevented.

A method for manufacturing a seat backrest 18 as described above, comprising an upper backrest adjustment device 28, is described below.

According to this method, a first step i) consists of providing the first upright 30, the second upright 32, and the support member 40.

In a second step ii), the support member 40 is positioned partly between the first and second uprights 30, 32, as represented in FIG. 9.

More specifically, the first side face 54 of the body 42 of the support member 40 is positioned partly facing an inner face 76 of the first upright 30. In particular, the first side face 54 of the body 42 of the support member 40 is positioned partly facing an inner face 76 of the first upright 30, such that the first projecting relief 52a is arranged facing, along the direction of the second transverse axis Y2, the first housing 35a in the first upright 30.

Similarly, the second side face 56 of the body 42 of the support member 40 is positioned partly facing an inner face 76 of the second upright 32. In particular, the second side face 56 of the body 42 of the support member 40 is positioned partly facing an inner face 76 of the second upright 32, such that the second projecting relief 52b is arranged facing, along the direction of the second transverse axis Y2, the second housing 35b in the second upright 32.

Intermediate parts, in particular bushings, may be mounted on the projecting reliefs 52a, 52b or in the housings 35a, 35b.

The first upright 30 is then moved relative to the second upright 32, as illustrated by the arrows F1, F2, along the direction of the second transverse axis Y2, during a step iii). Thus, the support member 40 is sandwiched between the first and second uprights 30, 32, such that the first projecting relief 52a is at least partially received in the first housing 35a of the first upright 30 and the second projecting relief 52b is at least partially received in the second housing 35b of the second upright 32.

In this step iii), the first and second uprights 30, 32 may be moved simultaneously or one after the other. Alternatively, only one of the first and second uprights 30, 32 may be moved. The support member 40 may also be moved relative to at least one among the first and the second upright 30, 32.

Step iii) ends when the first and second uprights 30, 32 are positioned relative to one another so as to form the backrest frame 20, in particular when the relative position of the first and second uprights 30, 32 enables the attachment of an upper crossmember 34 and/or a lower crossmember of the backrest frame 20.

Thus, at the end of step iii), a displacement of the support member 40 in a transverse direction Y is limited, or even prevented, by the first and second uprights 30, 32.

Furthermore, the projecting reliefs 52a, 52b of the support member 40 are respectively received in the housing 35a, 35b of the uprights 30, 32. Thus, due to the complementarity of shapes between the projecting reliefs 52a, 52b and the housings 35a, 35b, the support member 40 is guided in rotation about the second transverse axis Y2.

It should be noted that the operations of positioning the first and second uprights 30, 32, ready to form the backrest frame 20, and of assembling the support member 40 to the uprights 30, 32, are thus carried out simultaneously. The method is thus advantageously shorter and more economical. In addition, a single assembly tool can be used to perform these operations.

The crossmember 34 may be placed in position relative to the support member 40, during a step i'). In particular, the crossmember 34 is positioned facing, along the longitudinal direction X of the seat 10, the rear face 46 of the body 42 of the support member 40. According to a preferred embodiment, step i') may be carried out between step i) and ii). Alternatively, step i') may be carried out after step ii) or after step iii).

The method for manufacturing a backrest can then continue with a step iv) consisting of fixing the upper crossmember 34 to at least one among the first and second uprights 30, 32. In particular, step iv) consists of welding the upper crossmember 34 to at least one among the first and second uprights 30, 32. Alternatively, step iv) consists of screwing the upper crossmember 34 to at least one among the first and second uprights 30, 32. Step iv) may be carried out all at once by fixing the upper crossmember 34 simultaneously to the first and second uprights 30, 32, after step iii), as illustrated by arrow F3 in FIG. 10. Alternatively, the upper crossmember 34 may first be fixed, after step i) or step ii), to one among the first and second uprights 30, 32, and fixed during this step iv) to the other among the first and second uprights 30, 32 when the first and second uprights 30, 32 are positioned in a manner that allows such attachment.

The manufacturing method may further comprise a step v) consisting of fixing the actuator 58, on the one hand to the upper backrest adjustment device 28, in particular to the body 42 of the support member 40, and on the other hand to the backrest frame 20, in particular to one among the first upright 30, the second upright 32, and the upper crossmember 34. The actuator 58 may be fixed consecutively to the body 42 of the support member 40 and to the backrest frame 20, after the support member 40 has been mounted on the backrest frame 20. Alternatively, the actuator 58 may first be fixed to one among the body 42 of the support member 40 and the backrest frame 20, before the support member 40 is mounted on the backrest frame 20. The actuator is then fixed to the other among the body 42 of the support member 40 and the backrest frame 20, after the support member 40 has been mounted on the backrest frame 20. For example, the actuator 58 may first be fixed to the body 42 of the support member 40 after step i), and fixed to the crossmember 34 of the backrest frame 20 after step i').

The present disclosure is not limited to the single example described above and is capable of many variations.

Thus, according to an example not represented, it is the body 42 of the support member 40 which has inward reliefs suitable for engaging with projecting reliefs of the uprights 30, 32.

Furthermore, the complementarity of shapes between the reliefs 35a, 35b of the first and second uprights of the backrest frame 20 and the reliefs 52a, 52b of the support member 40 is capable of many variations.

For example, a projecting relief that is cylindrical of revolution, of one among the support member 40 and the uprights 30, 32, may be received in an inward relief forming a "U"-shaped slot in the other among the support member 40 and the uprights 30, 32 of the backrest frame 20.

So improve the comfort of the occupant of a vehicle seat, in particular a motor vehicle seat, the seat may provide several adjustments so it can be better adjusted to the occupant's morphology. Thus, the position of the seat can be adjusted relative to the steering wheel according to the size of the occupant. The seat backrest can be more or less tilted relative to the seating portion. The seat may also be equipped with a headrest for which the positioned height relative to the seat backrest can be adjusted by the occupant.

Comparative devices for adjusting the height of a vehicle seat backrest may be used, so that the position of the support area for the upper back of the occupant on the upper backrest is changeable. To achieve this, the devices in question comprise a support member which is pivotable relative to a backrest frame of the seat. Such comparative devices are generally assembled to a previously assembled backrest frame. However, such a comparative method for manufacturing a vehicle seat backrest has the disadvantage of being long and expensive due to the large number of successive operations.

The present disclosure improves the situation.

A method for manufacturing a vehicle seat backrest is provided, comprising the steps of:
  providing a first upright of a backrest frame, a second upright of the backrest frame, and a support member of an upper backrest adjustment device,
  positioning the first backrest frame upright partly facing a first side face of the support member and the second backrest frame upright partly facing a second side face of the support member,
  moving the first upright relative to the second upright of the backrest frame, along a transverse direction of the support member, in order to sandwich the support member of the upper backrest adjustment device, such that the support member of the upper backrest adjustment device is mounted on the first and second uprights of the backrest frame so as to pivot about a transverse axis.

The correct positioning of the first upright and second upright, ready to form the backrest frame, and the assembly of the support member of the upper backrest adjustment device to the first and second uprights, are thus performed simultaneously. The time used to carry out such a method for manufacturing a vehicle seat backrest and the associated costs are therefore reduced.

The method for manufacturing the vehicle seat backrest may include one or more of the following features, alone or in any of the possible technical combinations:
- in step iii, reliefs of the first and second uprights of the backrest frame and reliefs of the support member are associated in order to guide the support member of the upper backrest adjustment device in rotation about the transverse axis,
- in step iii, the reliefs of the first and second uprights are associated by the complementarity of their shapes with the reliefs of the support member or with a part interposed between the reliefs of the support member and the reliefs of the first and second uprights,
- the method comprises a step i', consisting of positioning a crossmember of the backrest frame relative to the support member, step i' preferably being carried out between step i and ii or after step iii,
- the method comprises a step iv, consisting of fixing the crossmember of the backrest frame to the first upright and/or second upright of the backrest frame, preferably by welding,
- the method comprises a step v, consisting of fixing an actuator of the upper backrest adjustment device to the support member and/or to at least one among the first upright, the second upright, and/or the crossmember of the backrest frame where appropriate, the actuator being able to control the rotation of the support member about the transverse axis.

According to another aspect, a vehicle seat backrest is provided, the backrest comprising a backrest frame and an upper backrest adjustment device, the backrest frame comprising a first upright and a second upright, the upper backrest adjustment device comprising a support member, the support member comprising a body intended to receive and support the upper back of an occupant of the seat, the support member being mounted so as to pivot on the first and second uprights of the backrest frame about a transverse axis, the support member and the first and second uprights of the backrest frame comprising associated reliefs, associated in particular by the complementarity of their shapes, for guiding the support member in rotation relative to the first and second uprights of the backrest frame, about the transverse axis.

The vehicle seat backrest may comprise one or more of the following features, alone or in any of the possible technical combinations:
- the reliefs of the support member project transversely from the body of the support member, the reliefs of the support member preferably extending from the side faces of the body of the support member, the reliefs of the support member each being received in a housing of the first and second uprights of the backrest frame,
- the reliefs of the support member are made as one piece with the body of the support member, the body of the support member and the reliefs of the support member preferably being made of plastic,
- the reliefs of the support member are cylindrical of revolution, their axes being the transverse axis,
- the backrest further comprises bushings mounted on the reliefs of the support member, the bushings having an outer face complementary to the housings of the first and second uprights of the backrest frame in order to guide the support member in rotation relative to the first and second uprights of the backrest frame, about the transverse axis,
- the upper backrest adjustment device comprises an actuator, for adjusting the position of the support member about the transverse axis,
- the actuator comprises:
- a motor,
- a worm screw extending in a main direction of extension perpendicular to the transverse axis, and able to be moved along said main direction of extension by the rotation of the motor,
- a movable assembly at one end of the worm screw,
- at least one connecting rod, the connecting rod being mounted so as to pivot relative to said movable assembly about a first shaft parallel to the transverse axis, at a first end, the connecting rod also being mounted so as to pivot relative to the backrest frame about a second shaft parallel to the transverse axis, at a second end, such that the displacement of the worm screw parallel to the transverse axis, due to the rotation of the motor, causes rotation of the support member about said transverse axis.

According to another aspect, a vehicle seat is disclosed comprising a seating portion with a seating portion frame, and a seat backrest as described above, the backrest frame being fixed to the seating portion frame, the backrest frame preferably being mounted so as to pivot relative to the seating portion frame, about a direction parallel to said transverse axis.

According to another aspect, an upper backrest adjustment device is disclosed for a vehicle seat, the vehicle seat comprising a backrest with a backrest frame, the upper backrest adjustment device comprising a support member, the support member comprising a body intended to receive and support the upper back of an occupant of the seat, the support member further comprising reliefs intended to be associated, in particular by the complementarity of their shapes, with housings in the backrest frame, in order to guide a rotation, about a transverse axis, of the support member relative to the backrest frame, the reliefs projecting transversely from the body of the support member, the reliefs preferably extending from the side faces of the body of the support member.

According to certain advantageous aspects, the upper backrest adjustment device of the vehicle seat may include one or more of the following features, alone or in any of the possible technical combinations:
- the reliefs of the support member are made as one piece with the body of the support member, the body of the support member and the reliefs of the support member preferably being made of plastic,
- the reliefs of the support member are cylindrical of revolution, their axes being the transverse axis,
- the upper backrest adjustment device further comprises bushings mounted on the reliefs of the support member, the bushings having an outer face complementary to the housings of the first and second uprights of the backrest frame in order to guide the support member in rotation relative to the first and second uprights of the backrest frame, about the transverse axis, the upper backrest adjustment device comprises an actuator, for adjusting the position of the support member about said transverse axis, the actuator comprises:

a motor, a worm screw extending in a main direction of extension perpendicular to the transverse axis, and able to be moved along said main direction of extension by the rotation of the motor, a movable assembly at one end of the worm screw, at least one connecting rod, the connecting rod being mounted so as to pivot relative to said movable assembly about a first shaft parallel to the transverse axis, at a first end, and intended to be mounted so as to pivot relative to the backrest frame about a second shaft parallel to the transverse axis, at a second end, such that the displacement of the worm screw due to the rotation of the motor is able to cause rotation of the support member about said transverse axis.

The invention claimed is:

1. A method for manufacturing a vehicle seat backrest, comprising the steps of:
   i. providing a first upright of a backrest frame, a second upright of the backrest frame, and a support member of an upper backrest adjustment device,
   ii. positioning the first upright of the backrest frame partly facing a first side face of the support member and the second upright of the backrest frame partly facing a second side face of the support member,
   iii. moving the first upright relative to the second upright of the backrest frame, along a transverse direction of the support member, in order to sandwich the support member of the upper backrest adjustment device such that the support member of the upper backrest adjustment device is mounted on the first and second uprights of the backrest frame so as to pivot about a transverse axis,
   wherein the vehicle seat backrest includes an actuator for adjusting the position of the support member about said transverse axis, and
   wherein the actuator comprises:
   a motor,
   a worm screw extending in a main direction of extension perpendicular to the transverse axis, and able to be moved along said main direction of extension by the rotation of the motor,
   a movable assembly at one end of the worm screw,
   at least one connecting rod, the connecting rod being mounted so as to pivot relative to said movable assembly about a first shaft parallel to the transverse axis, at a first end, and intended to be mounted so as to pivot relative to the backrest frame about a second shaft parallel to the transverse axis, at a second end, such that the displacement of the worm screw due to the rotation of the motor is able to cause rotation of the support member about said transverse axis.

2. The method of claim 1, wherein, in step iii, reliefs of the first and second uprights of the backrest frame and reliefs of the support member are associated in order to guide the support member of the upper backrest adjustment device in rotation about the transverse axis.

3. The method of claim 2, wherein, in step iii, the reliefs of the first and second uprights are associated by the complementarity of their shapes with the reliefs of the support member or with a part interposed between the reliefs of the support member and the reliefs of the first and second uprights.

4. The method of claim 1, comprising a step i' consisting of:
   i'. positioning a crossmember of the backrest frame, relative to the support member,
   step i' being carried out between step i and ii, or after step iii.

5. The method of claim 4, comprising a step iv consisting of:
   iv. fixing the crossmember of the backrest frame to the first upright and/or second upright of the backrest frame.

6. The method of claim 1, the method comprising a step v consisting of:
   v. fixing the actuator of the upper backrest adjustment device to the support member and/or to at least one among the first upright, the second upright, and/or the crossmember of the backrest frame where appropriate, the actuator being able to control the rotation of the support member about the transverse axis.

7. A vehicle seat backrest, the backrest comprising a backrest frame and an upper backrest adjustment device, the backrest frame comprising a first upright and a second upright, the upper backrest adjustment device comprising a support member, the support member comprising a body intended to receive and support the upper back of an occupant of the seat, the support member being mounted so as to pivot on the first and second uprights of the backrest frame about a transverse axis, the support member and the first and second uprights of the backrest frame comprising associated reliefs, for guiding the support member in rotation relative to the first and second uprights of the backrest frame, about the transverse axis, wherein the upper backrest adjustment device comprises an actuator, for adjusting the position of the support member about the transverse axis, and wherein the actuator comprises:

a motor, a worm screw extending in a main direction of extension perpendicular to the transverse axis, and able to be moved along said main direction of extension by the rotation of the motor, a movable assembly at one end of the worm screw, at least one connecting rod, the connecting rod being mounted so as to pivot relative to said movable assembly about a first shaft parallel to the transverse axis, at a first end, the connecting rod also being mounted so as to pivot relative to the backrest frame about a second shaft parallel to the transverse axis, at a second end, such that the displacement of the worm screw parallel to the transverse axis, due to the rotation of the motor, causes rotation of the support member about said transverse axis.

8. The vehicle seat backrest of claim 7, wherein the reliefs of the support member project transversely from the body of the support member, the reliefs of the support member each being received in a housing of the first and second uprights of the backrest frame.

9. The vehicle seat backrest of claim 8, wherein the reliefs of the support member are made as one piece with the body of the support member.

10. The vehicle seat backrest of claim 7, wherein the reliefs of the support member are cylindrical of revolution, their axis being the transverse axis.

11. The vehicle seat backrest of claim 7, further comprising bushings mounted on the reliefs of the support member, the bushings having an outer face complementary to the housings of the first and second uprights of the backrest frame in order to guide the support member in rotation relative to the first and second uprights of the backrest frame, about the transverse axis.

12. A vehicle seat comprising a seating portion with a seating portion frame, and a seat backrest according to claim 7, the backrest frame being fixed to the seating portion frame.

13. An upper backrest adjustment device for a vehicle seat, the vehicle seat comprising a backrest with a backrest frame, the upper backrest adjustment device comprising a support member, the support member comprising a body intended to receive and support the upper back of an occupant of the seat, the support member further comprising reliefs intended to be associated with housings in the backrest frame, in order to guide a rotation, about a transverse axis, of the support member relative to the backrest frame, the reliefs projecting transversely from the body of the support member, further comprising an actuator for adjusting the position of the support member about said transverse axis, and wherein the actuator comprises:

a motor, a worm screw extending in a main direction of extension perpendicular to the transverse axis, and able to be moved along said main direction of extension by the rotation of the motor, a movable assembly at one end of the worm screw, and at least one connecting rod, the connecting rod being mounted so as to pivot relative to said movable assembly about a first shaft parallel to the transverse axis, at a first end, and intended to be mounted so as to pivot relative to the backrest frame about a second shaft parallel to the transverse axis, at a second end, such that the displacement of the worm screw due to the rotation of the motor is able to cause rotation of the support member about said transverse axis.

14. The upper backrest adjustment device of claim 13, wherein the reliefs of the support member are made as one piece with the body of the support member.

15. The upper backrest adjustment device of claim 13, wherein the reliefs of the support member are cylindrical of revolution, their axes being the transverse axis.

16. The upper backrest adjustment device of claim 13, further comprising bushings mounted on the reliefs of the support member, the bushings having an outer face complementary to the housings of the first and second uprights of the backrest frame in order to guide the support member in rotation relative to the first and second uprights of the backrest frame, about the transverse axis.

* * * * *